UNITED STATES PATENT OFFICE.

HENRY SALZER, OF BALTIMORE, MARYLAND.

FOOD PACKAGE AND PROCESS OF PREPARING THE SAME.

SPECIFICATION forming part of Letters Patent No. 384,720, dated June 19, 1888.

Application filed September 26, 1887. Serial No. 250,753. (No specimens.)

*To all whom it may concern:*

Be it known that I, HENRY SALZER, of Baltimore, in the State of Maryland, have invented a new and useful Improvement in the Preservation of Meat and other Articles of Food, which improvement is fully set forth in the following specification.

This invention has reference to the preparation of meat and other articles of food for preservation during transportation and storage. Its object is to remove from the meat or other article all destructive or poisonous germs of every sort, to put it up in such a way as to preserve it in the best condition for long periods of time and at less expense than by the ordinary canning processes.

While the present invention furnishes the means for the safe preservation of the meat and other food articles, it is desirable, in order to secure the best results, that cleanliness and caution should be exercised in putting up the article, that the operations should be carried on in a room that has been thoroughly disinfected, and that the hands and clothing of the operatives, as well as all utensils and articles employed in the process, should likewise be disinfected.

It has been proposed heretofore to preserve meat or other food article by immersing it for a time in a substance such as paraffine, heating to 212° Fahrenheit, or higher, and allowing the paraffine to solidify around it. This method is ineffectual, mainly because the paraffine wrapper on cooling invariably cracks and becomes permeable to destructive organisms. A coating of paraffine cannot adapt itself to changes in shape of the inclosed article caused by contraction, and therefore such coating is of no avail. Attempt has been made to overcome this defect by an additional coating of gelatine mixed with glycerine and other substances; but this does not prevent the cracking of the paraffine coating, and the outer coating, (glycerine and gelatine,) instead of being a germicide, or even a germifuge, is the food of certain powerful species of bacilli. It has also been proposed to immerse the food article in an antiseptic bath and then dip into a melted uncrystallized hydrocarbon—such as cosmoline, vaseline, or phyloxine; but the objection to this process is that the interval between the two steps is sufficient to permit germs to settle in and upon the article, after which the protective wrapper is useless.

The present invention is based upon a study and knowledge of the conditions under which organisms (bacilli, &c.) multiply, as ascertained by recent investigations and discoveries, and which were not understood at the time the processes above referred to were proposed. According to the said invention the meat or other food article is first inclosed in an expansible wrapper—such as animal membrane—then exposed to a sterilizing-heat in a plastic substance, which remains around the article. On cooling, the article is or may be wrapped in gauze that has been treated with a solution of boric acid or other germicide, and finally rolled in plaster-of-paris. The plastic substance employed is preferably vaseline, which is a germifuge, and which on cooling adapts itself to changes in the size and shape of the article. It does not penetrate the animal membrane, and the latter prevents any part of its contents endosmosing into the vaseline bath. The package thus formed can be easily preserved and transported from place to place without injury. It is cheaply and easily produced. When it is desired to use the meat or other article, the wrapper is removed without difficulty, and meat so preserved after being kept a long time has been found unchanged in taste or appearance, with fiber intact, and wholly free from any trace of bacilli or other destructive germ.

In order that the said invention may be fully understood, I will describe the best mode known to me of carrying the same into effect, premising, however, that such description is given merely by way of example, and that I do not limit myself to the precise operations, proportions, materials, or other details specified.

To insure cleanliness of the process, the antiseptic method commonly employed in like processes should be followed, and the utensils and all materials employed should be disinfected, as by treating with a solution of two drams boric acid in one gallon of water, and afterward carefully washing to remove the acid.

The meat, as fresh as it can be obtained, is cut into pieces of convenient size and shape, remnants being utilized by dividing into small pieces. The animal membrane to be used is also disinfected, as with the solution above specified, and carefully washed; and if not immediately used it should be kept in a well-sterilized vessel. It is preferred, before filling the intestine, to sterilize the food article, as by keeping it for a short time in an atmosphere of live steam. Such treatment, which, however, is not essential, destroys all bacilli and fungi, but not the spores. Moreover, after filling the intestine there is opportunity for germs to settle on the outside thereof. The intestine, being filled with the meat or other food substance, is tightly tied at the ends with a disinfected twine, the twine ends being left somewhat long for convenience in subsequent handling without touching the article itself. The filled intestines are now inserted in vessels of earthenware or like material, corresponding in shape to the packages, and containing sufficient vaseline (combined with paraffine) to cover the packages completely, the latter being suspended in the vessels by tying the ends of the twine to a wire cover or support placed on top of the vessels. These receptacles are now placed in a steam-chamber of any suitable kind. I have used vessels of sheet-tin provided with a conical removable cover and foraminous shelves for the vessels containing the meat. In this chamber the packages are subjected to direct streams of hot steam for from one-half an hour to an hour. The duration of treatment and temperature depend somewhat on the size and character of the article treated, but must be sufficient to insure destruction of all germs or organisms of every kind. This being accomplished, the food article is now absolutely isolated by the surrounding vaseline, in which it remains until used. The earthenware vessels are now removed from the steam-chamber, covered with glass or tin plates, and put in a cool place for several hours. The twine ends are then cut off, the cuts being covered by vaseline, and the packages are rolled in plaster-of-paris, which, after heating, has been kept in a dry and well-closed place. They are then rolled in moist gauze wraps and allowed to dry, after which they are varnished or coated with india-rubber or gutta-percha, and the process is complete.

The gauze wraps, whether or not plaster-of-paris be used, are preferably also treated with a solution of boric acid.

It is obvious that modifications may be made in the mode of procedure above pointed out without departing from the spirit of the invention, and that parts of the invention may, if desired, be used without the whole.

Having now fully described my said invention and the manner in which the same is or may be carried into effect, what I claim, and desire to secure by Letters Patent, is—

1. The process of preserving meat or other food article by inclosing the same in an envelope of animal membrane, heating in a vessel containing vaseline, and inclosing in a protective wrapper of gauze coated with plaster-of-paris, substantially as described.

2. The process of preparing meat for preservation by inclosing the same in a wrapper of animal membrane, after disinfecting the latter, and then applying a coating of vaseline combined with a small quantity of paraffine, substantially as described.

3. The process of preserving meat or other food article by first treating the same to destroy bacilli or dangerous organisms, inclosing in a wrapper of animal membrane, after disinfecting the latter, heating in a bath of vaseline and paraffine, cooling without removal from the bath, and finally inclosing the article surrounded with its coating of vaseline and paraffine in a protective wrapper of gauze, after disinfecting the same, substantially as described.

4. As a new article of manufacture, a case or package consisting of an animal intestine having a coating of vaseline and a protective covering of plaster-of-paris and gauze and containing an article of food, substantially as described.

In testimony whereof I have signed this specification in the presence of two subscribing witnesses.

HENRY SALZER.

Witnesses:
PETER J. CAMPBELL,
C. DODD MCFARLAND.